Nov. 26, 1963  C. E. PRATER  3,111,777
HARVESTER
Filed June 23, 1961  3 Sheets-Sheet 1

INVENTOR
Charles E. Prater
BY
ATTORNEY

Nov. 26, 1963 C. E. PRATER 3,111,777
HARVESTER
Filed June 23, 1961 3 Sheets-Sheet 2
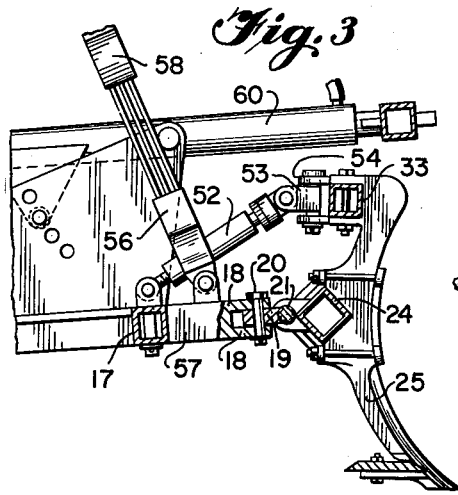
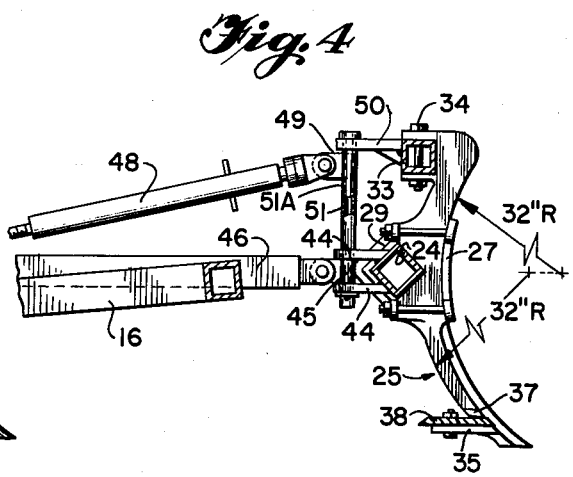
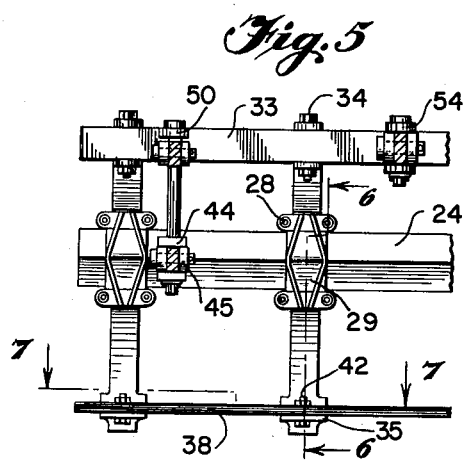
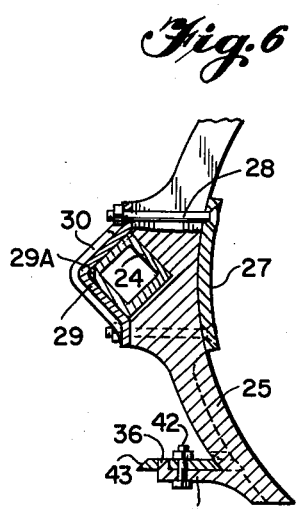
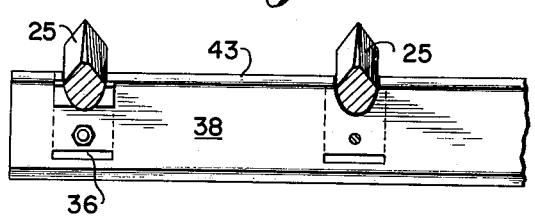
INVENTOR
*Charles E. Prater*
BY
ATTORNEY Nov. 26, 1963  C. E. PRATER  3,111,777
HARVESTER
Filed June 23, 1961  3 Sheets-Sheet 3
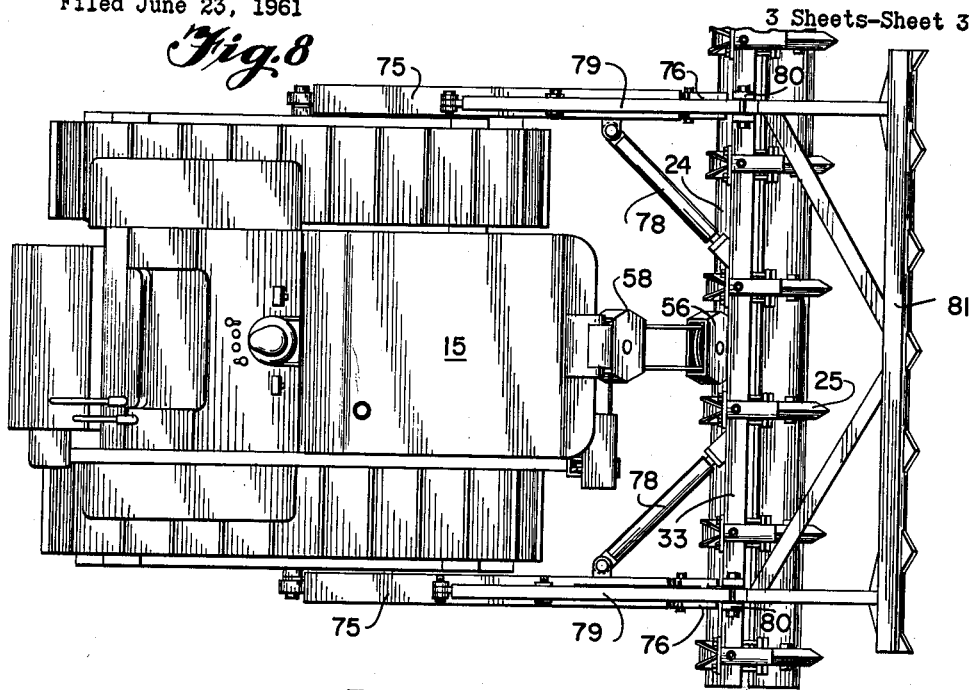
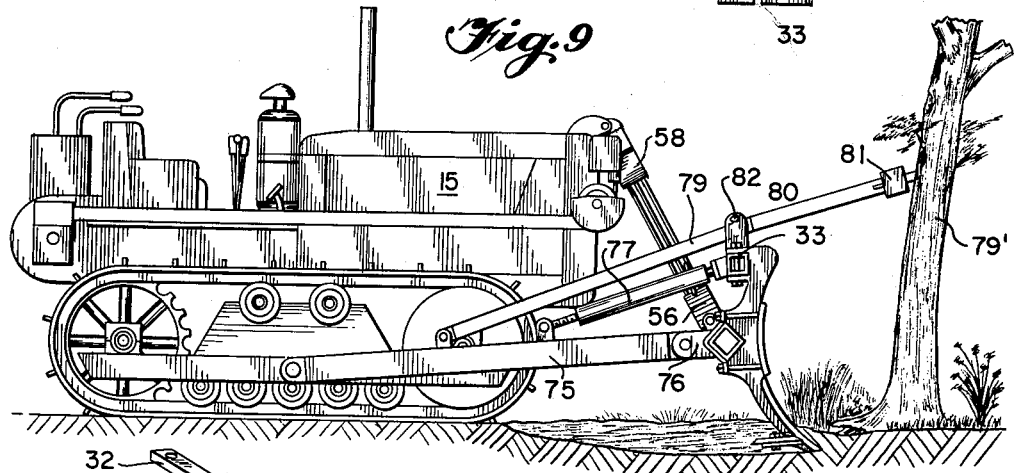
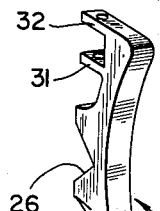
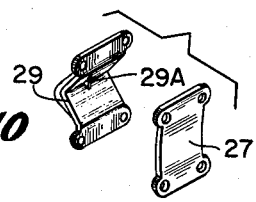
INVENTOR
Charles E. Prater
BY
ATTORNEY United States Patent Office 3,111,777
Patented Nov. 26, 1963

3,111,777
HARVESTER
Charles E. Prater, Waynesboro, Miss., assignor to
P. A. B. B. Incorporated, Meridian, Miss.
Filed June 23, 1961, Ser. No. 131,033
13 Claims. (Cl. 37—2)

The present invention relates to harvesting vegetation and land clearing and more particularly to the effective removal of vegetation, trees and the like without removing soil from the land so that such removed vegetation will be free of soil and the vegetation will be arranged into neat windrows for collection or other disposal.

Heretofore various types of harvesters including bulldozers and earth clearing equipment and the like have been provided but such equipment has not been entirely satisfactory because of failure to remove the vegetation above a predetermined depth below the earth's surface and failure to cut tap roots from the vegetation with the resulting objectionable regrowth of such vegetation. Further, the previously known devices and equipment have removed large quantities of earth which earth was retained on the vegetation. Consequently, the vegetation could not be usefully used and could not be burned or disposed of and required several years to rot before the area could be of practical use. Also the prior equipment has not been satisfactory for clearing land where tree and brush vegetation occur together and therefore the previously known equipment has not met the needs of the industry.

An object of the invention is to provide equipment which overcomes the problems of the prior art.

Another object of the present invention is to provide equipment for clearing vegetation from an area assuring effective killing of any portions of vegetation remaining in the earth whereby efficient immediate subsequent use can be made immediately after clearing the area.

A still further object is to clear land in a manner to minimize later damage by erosion.

Figure 1:
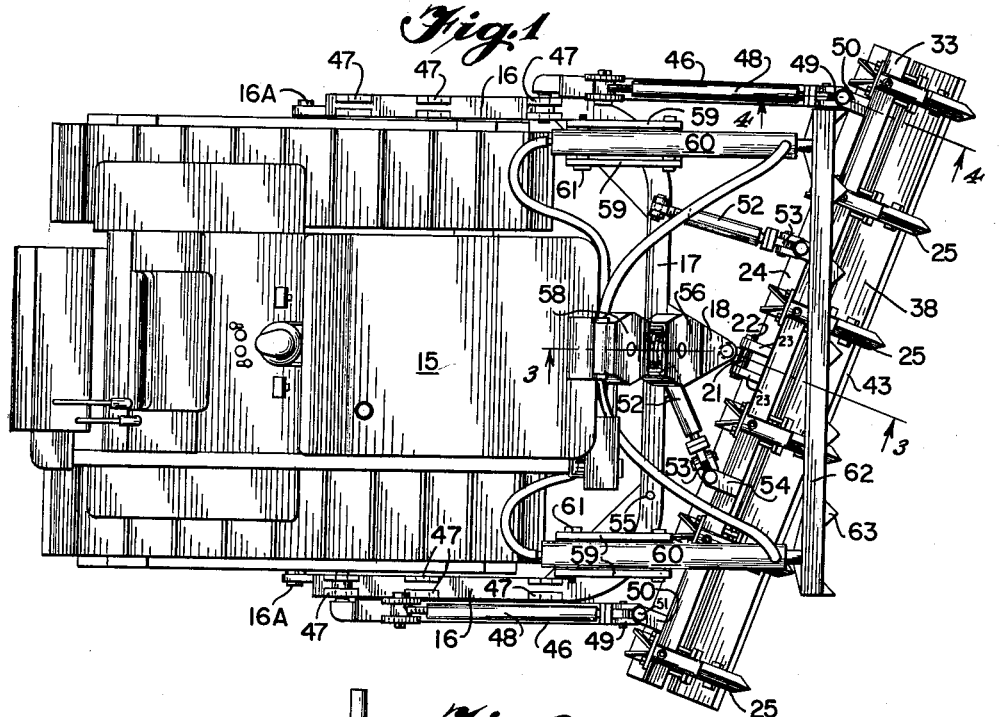
Figure 2:
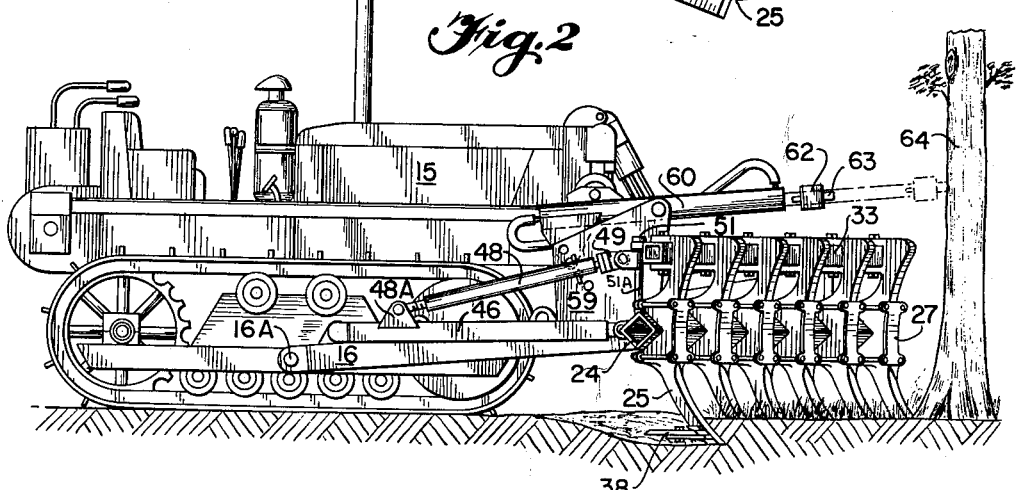
Figure 12:
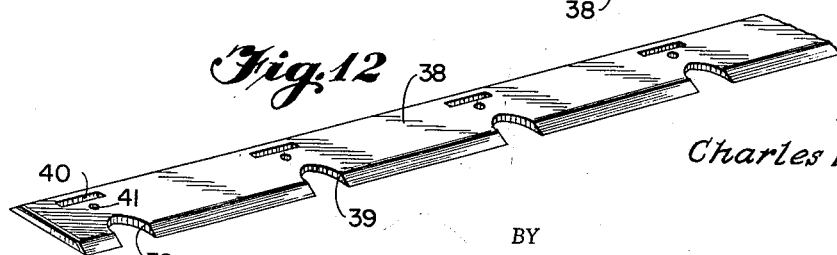

Other and further objects will be apparent as the description proceeds and upon reference to the accompanying drawings, wherein:

FIG. 1 is a plan view of the land clearing equipment including a tractor with a C-frame supporting a diagonally positioned land clearing toothed blade assembly and a hydraulically operated vertically adjustable pusher bar for overturning trees;

FIG. 2, a side elevational view of the tractor and the land clearing equipment showing the effect on the earth and showing the hydraulically operated pusher bar in its retracted position with a dotted line showing of the pusher bar in engagement with a tree to be uprooted;

FIG. 3, a fragmentary vertical section taken substantially on broken line 3—3 of FIG. 1, with the blade raising pulleys and cable omitted and showing the mounting support for the land clearing toothed blade assembly;

FIG. 4, a fragmentary vertical section taken substantially on broken line 4—4 of FIG. 1, showing the lateral support for the toothed blade and showing one tooth in elevation;

FIG. 5, a fragmentary rear elevational view of the left end portion of the toothed blade assembly showing the central supporting cross bar, the knife blade, and the rigidifying top bar secured to the teeth;

FIG. 6, a fragmentary enlarged vertical section taken substantially on line 6—6 of FIG. 5 showing the interengagement of the knife cutting blade with the bottom end of one tooth and showing the attachment of the tooth to the supporting cross bar;

FIG. 7, a fragmentary plan view taken substantially on broken line 7—7 of FIG. 5 showing the positive attachment of the knife cutter blade to the bottom end of the teeth;

FIG. 8, a plan view of a modified form of the land clearing equipment on a tractor showing the composite toothed blade assembly mounted in right angled relation to the direction of movement of the tractor and showing a fixed tree pusher bar above the blade;

FIG. 9, a side elevational view of the equipment of FIG. 8, showing the supporting surface being worked in section illustrating the operation of the equipment;

FIG. 10, a perspective view of an individual tooth of the toothed blade assembly showing the knife cutter supporting shelf and retaining lugs at the bottom, the intermediate main supporting bar receiving notch and the rigidifying bar receiving notch at the top;

FIG. 11, an exploded view of a tooth attaching and retaining plate and angular cap for the mounting of each tooth of the blade; and FIG. 12, a perspective of a fragment of the double edged knife cutter blade for reinforcing the individual teeth and for cutting vegetation below the surface of the earth.

Briefly stated, the present invention comprises a blade assembly formed of a plurality of curved teeth arranged in spaced side by side relation and supported on the front of the pusher bar means of a tractor and preferably arranged in diagonal relation to the movement of the tractor. A cutter bar of substantially flat construction is secured to the lower ends of the teeth substantially parallel to the surface of the earth to be worked. A tree engaging pusher bar is mounted on the tractor and extends forwardly of the blade assembly for engaging a tree or trees at a substantial height above the earth so that when the tractor is operating and moves forwardly the tree may be engaged at a substantial height and continuing movement of the tractor causes the tree to tip over away from the tractor in a forward direction exposing the roots of the tree, which roots are cut by the horizontally positioned cutting blades. Since the cutting blade is arranged diagonally it produces a sliding knife cutting action and serves to sever the tap root of the tree thereby completely loosening the tree from the earth, and further movement causes the tree to be pushed laterally sidewise by the diagonal arrangement of the toothed blade assembly and arranges the trees and other vegetation into windrows adjacent the path of the tractor.

A similar cutting action is accomplished on shorter vegetation where the tree pusher bar is not required, and such short vegetation is cut loose from the roots at a depth of about four inches below the surface of the earth by the flat knife type cutter which is parallel to the surface of the earth whereby the cutting action at such a depth prevents the vegetation from regrowing from the roots. The cut vegetation is caused to move into a windrow beside the tractor where such windrow can be disposed by collection for use or disposed of by burning in the windrow. The vegetation is substantially free of earth because of the cutting action at a shallow depth of four inches and because of the rolling action of the vegetation in front of the toothed blade assembly, the spaced teeth of the blade assembly permitting the earth to pass therebetween.

Referring more particularly to FIGS. 1–7 and 10–12 of the drawings, an endless track type tractor 15 is provided with a C-frame including pusher legs 16, 16 and a connecting bar 17 which C-frame is pivotally attached by its legs through pivots 16A to the chassis of the tractor.

A pair of forwardly extending lugs 18 in a gusset shaped bracket 57 secured to the transverse connecting bar 17 pivotally receive plate 19 therebetween with the plate 19 being movable about a vertical pivot pin 20 passing through lugs 18 and plate 19. A transversely extending pivot sleeve 21 on plate 19 receives a horizontally projecting pivot pin 22 which passes through rearwardly extending lugs 23 on a diagonally positioned square tubular blade supporting bar 24, which connections provide for pivotal movement of bar 24 about a vertical axis of pin 20 and horizontal axis of pin 22. The square toothed blade supporting bar is diagonally arranged with respect to the direction of movement of the tractor 15 and the side walls of the square bar are inclined to the surface of the earth although the bar is generally parallel to the surface of the earth.

Mounted on the tubular bar 24 are a plurality of identical teeth 25. Each tooth 25 is formed with a concave inner radius R and a convex outer radius R of 32 inches and such teeth are provided with a right angular notch 26 on the trailing edge intermediate the top and bottom which snugly receives the leading top and bottom surfaces of the blade supporting bar 24. Each tooth is supported in position by a cylindrically concave-convex plate 27 of a length appreciably greater than the transverse diagonal dimension of the blade supporting bar 24 and of a width, at least in portions thereof, greater than the width of the tooth whereby attaching bolts 28 pass through openings in the corners of the plate 27 and pass beside the tooth extending into openings at the corners of a cooperating angular cap 29 which angular cap 29 embraces the upper and lower surfaces of the trailing edge of the blade supporting bar 24. The nuts and cooperative bolts 28 secure the plate 27, and angular caps 29, and cooperating teeth to the blade supporting bar in positive fixed relation. A keying rib 29A is provided in the dihedral angle of the cap 29 and is received in a keying notch in the trailing edge of bar 24 to positively retain the tooth in position. The angular tooth retaining cap 29 is provided with reinforcing ribs 30 on its outer surface.

At the upper end of each tooth 25 a U-shaped notch is formed by means of rearwardly extending lugs 31 and 32 which notch receives a square rigidifying bar 33 secured in place by means of bolts 34 passing through apertures in the lugs and in the bar thereby providing a composite blade assembly with the diagonally arranged tubular bar 24.

A knife blade supporting shelf 35 integral with the lower end of each tooth 25 extends rearwardly from the bottom of the tooth and has an upwardly extending flange 36. Positioned above the shelf 35 are a pair of cutting blade retaining lugs 37. Between the shelf 35 and lugs 37 a double-edged cutter blade 38 is mounted. The cutter blade is provided with forwardly opening tooth receiving notches 39 embracing the corresponding tooth and forming a positive connection therewith. The cutter blade 38 is also provided with shelf flange receiving openings 40 and bolt retaining openings 41 receiving the corresponding flange 36 and retaining bolts 42, respectively, thereby positively securing the cutter blade in position. The cutter blade extends the complete width of the blade assembly and is sharpened by obtuse bevels 43 extending from the upper face. The leading cutting edge 43 of the blade 38 extends to and embraces in notches 39 the widest bottom end portions of each tooth 25 and the leading surface of the bottom portion of each tooth is of shallow wedge shape as seen in plan to permit camming or lateral sliding of vegetation over a tooth 25 and onto an adjacent section of the knife type cutting blade. The knife blade 38 is operative to cut vegetation in both forward and reverse directions.

To maintain the blade assembly in proper operative relation to the tractor, rearwardly extending lugs 44 at opposite ends of blade supporting bar 24 support vertical pivot pins 51 passing therethrough and through yoke-shaped connectors 45 pivotally mounted on main positioning arms 46 by means of a horizontally extending pivot and the rear ends of such main positioning arms 46 are pivotally mounted in selected sets of lugs 47 on the pusher legs 16 of the C-frame thereby determining the diagonal arrangement of the blade assembly. The inclination of the blade assembly about horizontal pivot pin 21 is controlled by outside turnbuckle 48 pivotally secured at one end to the upwardly extending lugs 48A on the main positioning arms 46 and by means of a U-shaped yoke 49 pivoted to a rearwardly extending bracket 50 on the rigidifying bar 33, which bracket 50 may be in alignment with rearwardly extending lugs 44 on the blade supporting bar 24 whereby a single fastening pin 51 may be used to secure the ends of main positioning arm 46 and turnbuckle 48 in position. Pin 51 is provided with suitable shoulders or the like to assure proper maintenance of the angular relation, and such shoulders may be obtained by the use of a sleeve 51A or the like.

Inner turnbuckles 52 are pivotally mounted on one end by means of universal type connections 53 to rearwardly extending lugs 54 on the rigidifying bar 33, the other end of such turnbuckles 52 being selectively received in one of the four apertures 55 in transverse bar 17 of the C-shaped lifting and pushing frame of the tractor, the connection being made by suitable universal yoke connections which provide for the angular adjustment. Additional apertures 55 may be provided for greater adjustment.

It will thus be seen that applicant can vary the angularity of the blade assembly by changing the position of the rear ends of the main positioning arms 46 in any one of the corresponding pairs of lugs 47 on the main arms 16 so the diagonal adjustment of the toothed blade assembly can be made. Proper positioning of the rear ends of turnbuckles 52 in any one of the openings 55 shown in connecting bar 17 provide for the diagonal adjustment. The inclination of the toothed blade assembly to the surface of the earth can be controlled relative to the surface of the earth being worked by adjusting turnbuckles 48 and 52.

The knife cutter blade 38 is positioned with its bottom surface approximately two inches from the bottom ends of the teeth and the cutting action takes place approximately four inches below the surface of the earth thereby assuring complete harvesting by cutting the roots of the vegetation below the surface of the earth and preventing regrowth of vegetation from the portion of the roots remaining in the soil.

As shown in the present application, the tractor is provided with the usual cable system for raising and lowering the C-frame and the toothed blade assembly and a pulley 56 is mounted on the bar 17 or on the gussett projection 57 thereon cooperating with another pulley 58 on the tractor frame with a suitable cable reeved therebetween for raising and lowering the blade assembly.

A pair of mounting plates 59 in spaced side by side relation are fixed to the forward end of each pusher leg 16 of the C-shaped frame and a hydraulic cylinder 60 is pivotally mounted between each pair by means of an intermediate pivot and the angularity of such hydraulic cylinders is controlled by a cooperating removable pin 61 passing through gusset plates fixed to the rear ends of hydraulic cylinders 60 and passing through aligned openings in the plates 59. Extending between the piston rods of the hydraulic cylinders and supported thereby is a transversely extending pusher bar 62 which is provided with a plurality of triangular prism-shaped blocks 63 on its forward surface which provide for non-slipping engagement with a standing tree 64 or the like. The hydraulic cylinders are operated by a usual hydraulic control for changing the position of the pusher bar from the full-line position shown in FIG. 2 to the dotted-line projected position when a tree is to be overturned.

To fell a tree the operator of the tractor drives the tractor with the blade assembly adjusted to make a cut four inches below the surface of the soil as shown in FIG. 2 and when a tree is encountered the operator moves the pusher bar 62 to the dotted-line projected position, causing the tree to be engaged and upon further movement of the tractor the roots of the tree become exposed prior to engagement with the knife cutter blade 38 or with the individual teeth 25. The portions of the roots adjacent the tractor are engaged by the cutting edge 43 of the cutter blade 38 and the roots are cut off below the ground level and as the tree is pushed forwardly other roots come into contact with cutter blade 38 and are severed. The diagonal or echelon arrangement of the cutting blade permits and causes the roots of the tree to slide along the cutting edge 43, thereby severing the roots and if the severing action does not take place between two adjacent teeth the roots engaging the leading edge of the blade 38 may cam over a tooth 25 and pass onto another section of the cutting blade 38, assuring complete severance of the roots at a substantial distance below the surface and also assuring that the tap root of the tree will be effectively severed, thereby precluding any possibility of regrowth of a tree from the root structure.

Another way of operating the equipment is to drive the tractor adjacent the tree and with the tractor stationary the pusher bar 63 can be operated by the hydraulic cylinder to overturn the tree, but in the interest of rapid clearing of land the first method of operation has been found particularly satisfactory and advantageous. Since the vegetation including trees are overturned and cut from the earth and are rolled over by the particular curve and shape of the teeth only the upper surface portion of the earth is disturbed and substantially all of the earth is dislodged from the vegetation and the vegetation is rolled into windrows adjacent the path of the tractor and such vegetation can then be collected as in harvesting or can be burned or otherwise disposed of with a minimum of expense.

Referring more particularly to FIGS. 8 and 9, a tractor of the same type operated by the usual cable and pulley 56, 58 in a similar manner to that previously described. Pusher arms 75 are pivotally connected to yokes 76 on main blade supporting bar 24 and the inclination of the blade assembly is obtained by outer turnbuckles 77 and inner turnbuckles 78 which are suitably adjustable between the rigidifying bar 33 and the pusher arms 75, thereby controlling the inclined position of the blade assembly to the surface of the earth to obtain the correct operating relation.

In the form of the invention shown in FIG. 9 the operation of pushing the tree 79 is accomplished by means of relatively rigid tree pushing arms 79 pivotally mounted on lugs on the pusher arms 75 and guided in suitable guides or projections 80 having openings to receive tree pushing arms 79 securing the tree pushing arms to the blade assembly by pins 81 overlying pusher arms 79. The guides 80 may be adjustably mounted on a rigidifying bar 33 by any suitable means so that a pusher bar 81 secured to the forward end of pusher arm 79 will be maintained in operative relation and will be prevented from jacknifing upon engagement with a tree. When it is desired to adjust the blade assembly for diagonal arrangement sufficient clearance or adjustability is provided to permit angular adjustment of the toothed blade assembly when desired.

It will be evident that the cutter blade 38 may operate in both forward and reverse directions of movement of the tractor and it will be apparent also that applicant can harvest crops of vegetation from the earth's surface without regard to variations in the type of vegetation on the earth's surface since the cutting blade will cut small vegetation and the pusher bar will engage taller vegetation to partially expose the roots so that small diameter portions of the roots will be engaged by the cutter and be readily severed without severing the excessively heavy portions of the roots. The trees and other vegetation will be felled in front of the blade assembly and such vegetation will contact the blade assembly and will be caused to rotate thereby loosening the earth still attached to the vegetation and causing the vegetation to be collected into windrows from which windrows the vegetation may be collected for use or may be collected for disposal by burning or by any other suitable means. In some situations where the cutter blade is pushed upwardly by the material of the ground being worked, a reverse movement of the tractor will cause vegetation to be severed which may not have been severed during the forward motion of the tractor and cutter and thereby substantially complete harvesting of a crop of vegetation can be obtained in a minimum of time and with a minimum of cost.

From the above description it is believed that one skilled in the art should be able to make and use the invention for harvesting crops and clearing land in a more efficient and economical manner and with less disturbance of the soil and therefore resulting in less erosion in land cleared by the method and apparatus of the present invention.

What is claimed is:

1. A machine for clearing vegetation including trees and brush from the surface of the earth comprising a tractor having a C-shaped pusher bar pivoted thereto, a cross bar mounted on said C-shaped bar for diagonal positioning relative to the direction of movement of the tractor, a plurality of teeth of 32 inch concave radius on their leading edges and having a right angular notch in a trailing intermediate portion thereof for mounting on the diagonal bar, an angular cap positioned on said bar, said angular cap having a key received in a keyway on the trailing edge of the bar preventing lateral movement, an arcuate plate mounted on the leading concave surface of each tooth thereof, bolts extending through each arcuate plate on each side of said teeth and above and below said diagonally positioned bar and passing through said angular cap thereby fixedly securing the teeth to said diagonally positioned bar, a U-shaped notch in the top and on the trailing edge of each tooth, a square tubular bar in said U-shaped notch and fixed to each tooth by a bolt, a cutter supporting shelf mounted on the bottom end of each tooth and having an upwardly extending lug at the trailing edge, laterally extending lugs on each side of said tooth, an elongated cutter blade having recesses on the leading edge for receiving the adjacent trailing portion of the teeth with the blade fitting between said shelf and said lugs, said blade having slots receiving said upwardly extending lugs of said shelves and bolt means securing said cutter to said shelves, said cutter being sharpened by beveling its upper surface on the leading and trailing edges thereof providing for cutting operation in both directions of movement, said cutter additionally serving to strengthen the teeth.

2. The invention according to claim 1 in which strut means extend from the C-shaped pusher bar and projects forward of the leading upper edge of the teeth in the order of 1 foot, a transverse bar fixed to said strut means to assure striking a tree and causing the roots thereof to be raised prior to engagement by the lower ends of the teeth and the cutter blade, the diagonal cutter blade assuring a slicing cut.

3. The invention according to claim 2 in which each tooth has a blunt wedge shaped leading edge from the diagonally positioned blade assembly supporting bar to the bottom and has a tapered curved trailing edge assuring strength while providing for lateral movement of material being cut.

4. The invention according to claim 3 in which the teeth are positioned approximately 21 inches apart center-to-center.

5. The invention according to claim 4 in which the teeth extend below the cutter blade by approximately 2½ inches.

6. Harvesting equipment for complete removal of the vegetation by severing the vegetation several inches below the surface of the earth comprising a tractor, a blade assembly mounted on said tractor in diagonal arrangement to the path of movement of the tractor and mounted for raising and lowering with respect to the tractor, said blade comprising a plurality of arcuate shaped spaced teeth with the concave surface extending forwardly, a flat cutter blade mounted at the lower ends of said teeth approximately 2 inches from the ends thereof and arranged to be substantially parallel to the surface of the earth when the flat cutter blade is approximately 4 inches below the surface of the earth, a pair of hydraulically operated cylinders mounted adjacent each end of said blade and pivotally connected thereto intermediate the ends of the hydraulic cylinder, means to fix the angularity of each hydraulic cylinder, the piston rod of each hydraulic cylinder extending forwardly in front of the blade when the pistons of the hydraulic cylinders are retracted, a bar connecting the piston rods of said hydraulic cylinders, tree-engaging cleat elements on said bar for contacting a tree and preventing sliding movement between the tree and said connecting bar whereby the tractor may pass through an area to be harvested and cut the vegetation below the surface, partially push the trees forwardly and sever the roots of the trees at a location below the heavy root portions thereby minimizing the cutting required to sever the tree from the earth.

7. A blade assembly for harvesting vegetation and placing such vegetation in the windrows for further treatment, comprising a main blade supporting bar, a plurality of individual teeth having yoke-shaped rearwardly opening notches mounted on said bar in spaced relation, a plurality of cap members positioned rearwardly on said bar embracing the rear portion thereof and cooperating with the rearwardly opening notches in said teeth, means to secure said cap members to corresponding teeth and to said bar in rigid assembled relation, means to mount a rigidifying bar on the teeth adjacent one end of the teeth, means for supporting a vegetation cutter on the other end of said teeth in a manner to provide support between adjacent teeth and for maintaining an operative spacing of the teeth, and means to secure said blade assembly to the pusher bar arrangement of a tractor.

8. The invention according to claim 7 in which tree-engaging means are provided above the blade assembly for attachment to the pusher bar arrangement of a tractor for extension outwardly and beyond a blade assembly on said pusher bar arrangement of a tractor whereby tree may be engaged at a substantial height before the blade assembly reaches the base of the tree, whereby a tree may be partially uprooted and the roots cut therefrom.

9. The invention according to claim 8 in which hydraulic cylinders support the pusher.

10. A blade for use in harvesting vegetation by cutting the vegetation below the level of the earth to prevent regrowth of such vegetation from the roots remaining in the soil, said blade assembly comprising a blade supporting bar of rectangular section, a plurality of teeth having a concave surface on the leading edge thereof, each tooth having a dihedral notch formed in the trailing edge thereof for embracing two surfaces of the blade supporting bar, an angular attaching cap for cooperation with the trailing surfaces of the bar and for attachment to the associated tooth, a plate mounted on the leading surface of said tooth opposite said notch, means securely retaining said plate against said tooth and reacting against said angular cap retaining the associated tooth in fixed position, means at the upper end of each tooth for connecting said teeth to rigidify the blade assembly, trailingly extending spaced cutter blade supporting means on the lower end of each tooth terminating short of the leading edge thereof, a cutting blade mounted between said spaced means, means to positively connect said cutting blade to said teeth to thereby improve the rigidity and strength of the individual teeth and of the blade assembly, said cutting blade being provided with bevels at an obtuse angle to the upper surface on the leading and trailing edges thereof with the leading cutting edge being immediately adjacent the widest portion of the tooth whereby vegetation may be cut by said blade in both directions of movement of said blade with a minimum of interference by said teeth, said teeth projecting downwardly below said cutting blade and at an acute angle to the surface of the earth in the leading direction for assisting in maintaining the teeth and the blade at a definite depth with respect to the surface of the earth.

11. A tooth for use in land clearing comprising an elongated arcuate shaped body having a chord length of approximately 46 inches and having a concave radius of approximately 32 inches and having a rearwardly extending notch on its convex edge located approximately 20 inches from the top with the angle arranged so that the bottom of the tooth is approximately one foot forwardly of the concave position opposite the rearwardly extending notch, the cross section of the leading and concave edge of said tooth below said notch being generally wedge shaped and the trailing and convex edge being of curved wedge shaped section with the widest portion of the tooth lying intermediate its leading and trailing edge, a blade supporting shelf mounted on said tooth approximately 2 inches from the bottom and trailing from the widest portion of the tooth, a pair of lugs spaced upwardly from said shelf and trailing from the widest portion of the tooth, the spacing of said lugs from said shelf providing for receiving a cutting blade with the cutting edge lying closely adjacent the widest portions of the teeth adjacent the leading portions of said shelf and lugs, said tooth being securable to a rectangularly shaped beam for attachment to a power driven vehicle.

12. Equipment comprising a body having a concave shaped leading surface of approximately 32 inch radius about a horizontal axis, a cutter supporting shelf of a length approximately the width of the tooth and extending away from the convex curved trailing surface and lying substantially within the width of the blade, said shelf having an upwardly extending blade retaining lug, lugs on the side edges of said tooth spaced above said shelf for confining a cutter blade while permitting easy insertion of a cutter blade, means to secure said blade to said shelf whereby a blade may extend between similar teeth to provide reinforcing of one tooth from another.

13. The invention according to claim 12 in which a dihedral supporting bar receiving notch is provided on the back of said tooth and so positioned as to locate the bottom end of the tooth well ahead of the top of the tooth.

References Cited in the file of this patent

UNITED STATES PATENTS

| | | |
|---|---|---|
| 2,491,058 | Peacock et al. | Dec. 13, 1949 |
| 2,625,870 | Peacock et al. | Jan. 20, 1953 |
| 2,633,164 | Kissner et al. | Mar. 31, 1953 |
| 2,716,823 | Mullin | Sept. 6, 1955 |
| 2,722,758 | Loftin et al. | Nov. 8, 1955 |
| 2,814,134 | Forte | Nov. 26, 1957 |
| 3,021,619 | McGee | Feb. 20, 1962 |